United States Patent
Kela et al.

(10) Patent No.: US 12,166,582 B2
(45) Date of Patent: Dec. 10, 2024

(54) LEG SELECTION FOR IMPROVED RELIABILITY OF MULTI-CONNECTIVITY

(71) Applicant: NOKIA TECHNOLOGIES OY, Espoo (FI)

(72) Inventors: Kalle Petteri Kela, Kaarina (FI); Daniela Laselva, Klarup (DK); Qiyang Zhao, Antony (FR); Stefano Paris, Vanves (FR)

(73) Assignee: Nokia Technologies Oy, Espoo (FI)

( * ) Notice: Subject to any disclaimer, the term of this patent is extended or adjusted under 35 U.S.C. 154(b) by 490 days.

(21) Appl. No.: 17/632,683

(22) PCT Filed: Nov. 25, 2019

(86) PCT No.: PCT/EP2019/082441
§ 371 (c)(1),
(2) Date: Feb. 3, 2022

(87) PCT Pub. No.: WO2021/028064
PCT Pub. Date: Feb. 18, 2021

(65) Prior Publication Data
US 2022/0264354 A1 Aug. 18, 2022

(30) Foreign Application Priority Data
Aug. 14, 2019 (WO) ................. PCT/EP2019/071791

(51) Int. Cl.
*H04W 28/02* (2009.01)
*H04L 1/00* (2006.01)
*H04L 1/08* (2006.01)
*H04L 69/28* (2022.01)

(52) U.S. Cl.
CPC .............. *H04L 1/0076* (2013.01); *H04L 1/08* (2013.01); *H04L 69/28* (2013.01); *H04W 28/0231* (2013.01)

(58) Field of Classification Search
CPC .................................................. H04W 28/0231
See application file for complete search history.

(56) References Cited

U.S. PATENT DOCUMENTS

2018/0270679 A1 9/2018 Laselva et al.
2018/0367288 A1 12/2018 Vrzic et al.

FOREIGN PATENT DOCUMENTS

WO WO-2016050926 A1 * 4/2016 ............. H04B 7/026

OTHER PUBLICATIONS

Huawei et al., "Clarification of objectives of the IIoT Rel-16 study" 3GPP TSG RAB Meeting #81, Gold Coast Australia, Sep. 10-13, 2018, RP-181690 (Year: 2018).*
Spreadtrum Communications, "Leg Selection for UL PDCP duplication transmission", 3GPP TSG-RAN WG2 Meeting #106, Reno, US, May 13-May 17, 2019, R2-1905690 (Year: 2019).*
(Continued)

*Primary Examiner* — Joseph A Bednash
(74) *Attorney, Agent, or Firm* — Barta Jones, PLLC

(57) ABSTRACT

Disclosed is a method comprising obtaining a reliability estimate indicating transmission success probability for a plurality of transmission legs and assigning a data packet type to a subset of the plurality of transmission legs based at least partly on said reliability estimate.

20 Claims, 12 Drawing Sheets

(56) References Cited

OTHER PUBLICATIONS

International Search Report and Written Opinion dated Apr. 21, 2020 corresponding to International Patent Application No. PCT/EP2019/082441.
Notification of Transmittal of the International Preliminary Report on Patentability & International Preliminary Report on Patentability dated Dec. 23, 2021 corresponding to International Patent Application No. PCT/EP2019/082441.
3GPP TS 38.323 V15.6.0 (Jun. 2019), Technical Specification, 3rd Generation Partnership Project; Technical Specification Group Radio Access Network; NR; Packet Data Convergence Protocol (PDCP) specification (Release 15), Jun. 2019.

* cited by examiner

LEG SELECTION FOR IMPROVED RELIABILITY OF MULTI-CONNECTIVITY

FIELD

The following exemplary embodiments relate to reliability of connectivity in a cellular communication network.

BACKGROUND

As resources are limited, it is desirable to optimize the usage of network resources. A cell in a cellular communication network may be utilized such that better service may be provided to one or more terminal devices. The optimization of the usage of one or more cells may therefore enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising means for obtaining a reliability estimate indicating transmission success probability for a plurality of transmission legs and assigning a data packet type to a subset of the plurality of transmission legs based at least partly on said reliability estimate.

According to another aspect, there is provided an apparatus comprising at least one processor, and at least one memory including computer program code, wherein the at least one memory and the computer program code are configured, with the at least one processor, to cause the apparatus to: obtain a reliability estimate indicating transmission success probability for a plurality of transmission legs and assign a data packet type to a subset of the plurality of transmission legs based at least partly on said reliability estimate.

According to another aspect, there is provided a computer-implemented method comprising obtaining a reliability estimate indicating transmission success probability for a plurality of transmission legs and assigning a data packet type to a subset of the plurality of transmission legs based at least partly on said reliability estimate.

According to another aspect, there is provided a computer program product readable by a computer and, when executed by the computer, configured to cause the computer to execute a computer process comprising obtaining a reliability estimate indicating transmission success probability for a plurality of transmission legs and assigning a data packet type to a subset of the plurality of transmission legs based at least partly on said reliability estimate.

According to another aspect, there is provided a computer program product comprising computer-readable medium bearing computer program code embodied therein for use with a computer, the computer program code comprising code for executing obtaining a reliability estimate indicating transmission success probability for a plurality of transmission legs and assigning a data packet type to a subset of the plurality of transmission legs based at least partly on said reliability estimate.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
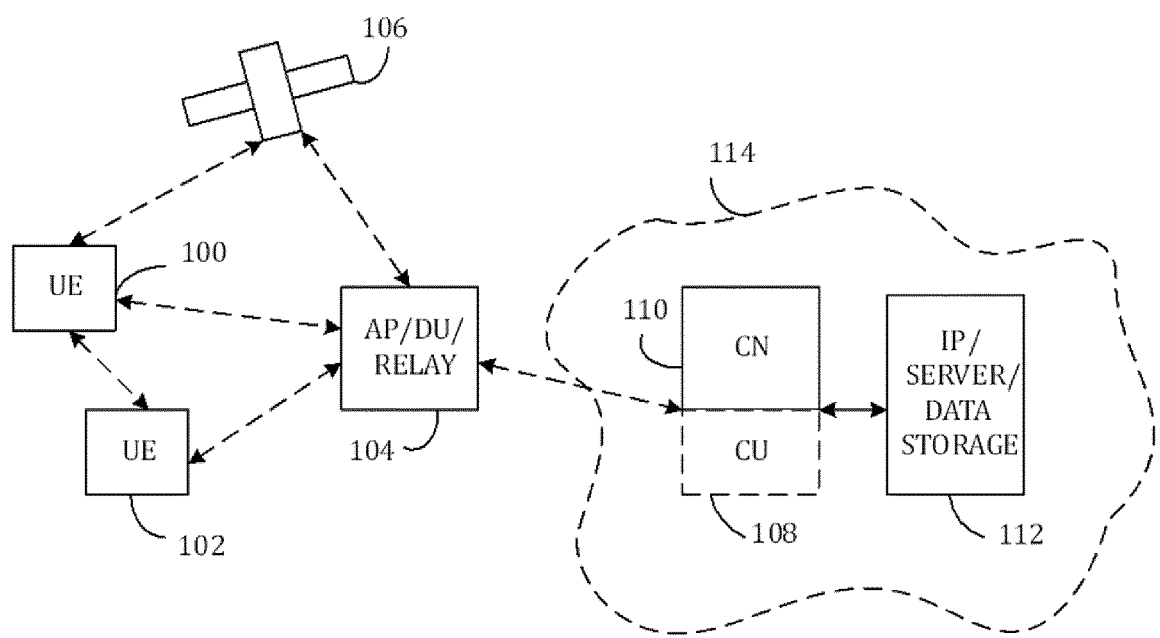
FIG. 1 illustrates an exemplary embodiment of a cellular communication network.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some exemplary embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2A:
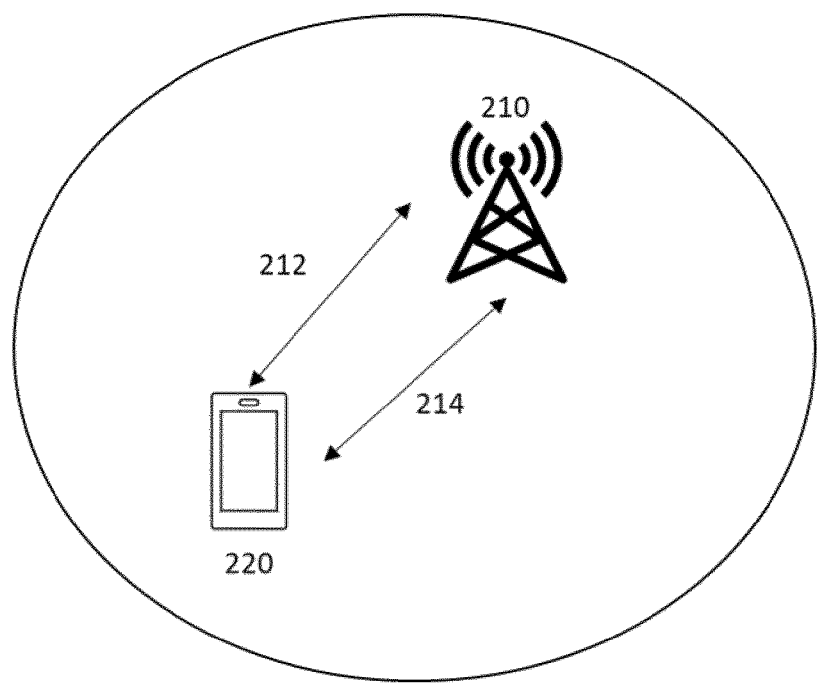
FIG. 2a and FIG. 2b illustrate exemplary embodiments of carrier aggregation and dual connectivity.

In order to better utilize resources of a cell provided by an access node such as e/gNodeB, carrier aggregation may be utilized. Carrier aggregation, CA, enables higher data transmission rates to be used for a terminal device served by the access node by enabling the terminal device to transmit and receive of data on multiple component carriers from the access node. This is illustrated in FIG. 2a. Access node 210 provides component carriers 212 and 214 that may be used by the terminal device 220 to transmit and receive data. It is to be noted that although two component carriers 212 and 214 are illustrated in FIG. 2A, there may be more component carriers that are provided by the access node 210 and used by the terminal device 220 to transmit and receive data.

Carrier aggregation therefore may assign a plurality of component carriers to one terminal device. A component carrier may be understood as a frequency block and the plurality of component carriers in the carrier aggregation may therefore each be different frequency blocks thereby increasing the bandwidth that may be utilized for data transmission and receival between the access node 210 and the terminal device 220. Various types of carrier aggregation may exist. For example, so called intra-band contiguous carrier aggregation in which the plurality of component carriers are contiguous in the same frequency band. In another example, the plurality of component carriers are separated by a gap within the same frequency band. This type of carrier aggregation may be called as intra-band non-contiguous. In yet another example, in so called inter-band carrier aggregation the plurality of component carriers are in different frequency bands.

Figure 2B:
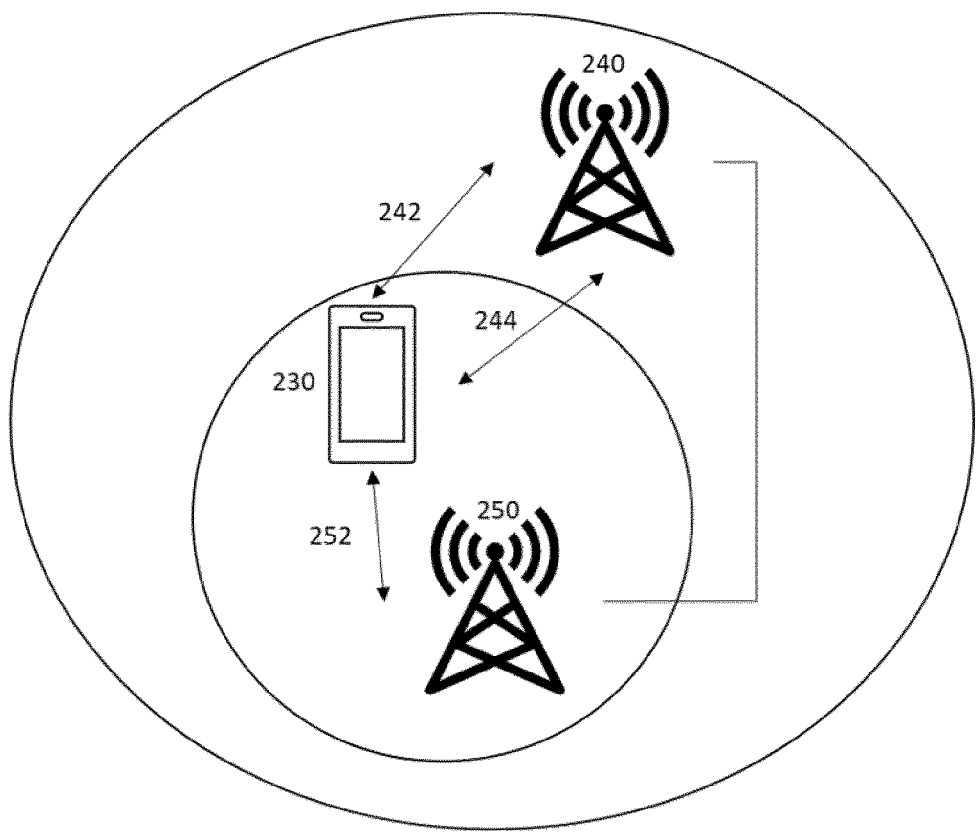

FIG. 2b illustrates dual connectivity. In dual connectivity the terminal device 230 may transmit and receive data from two access nodes 240 and 250 simultaneously. One of the two access nodes may in such exemplary embodiment act as a master access node, which may also be called as a primary access node, through which the connectivity to the secondary access node may be handled. In this exemplary embodiment access node 240 is the master access node. As in dual connectivity a terminal may utilize resources from two radio sites, it may also be referred to as inter-site carrier aggregation. In the exemplary embodiment of FIG. 2b, the component carriers that may be used by the terminal device are the component carriers 242, 244 and 252.

The access nodes 240 and 250 may be any suitable access nodes such as e/gNodeB. In this exemplary embodiment, the access node 240 is an eNodeB and the access node 250 is a gNodeB. The access node 240 thereby provides a larger cell coverage than the access node 250. Access node 250 then on the other hand provides greater capacity than access node 240. In other words, while 4G may provide coverage, 5G may be utilized for capacity for the terminal device 230 thereby allowing 5G to utilize existing 4G infrastructure.

The terminal device 230 may therefore, by utilizing dual connectivity, benefit from two different cell sites simultaneously.

As mentioned above, the geographical coverage of a cell provided by an access node may vary. For example, a 4G cell may have a greater coverage area than a 5G cell and/or one 5G cell may have greater cell coverage than another 5G cell. A small cell may therefore be understood to refer to a cell that has a smaller geographical coverage area than another cell. In some exemplary embodiments a macrocell is a cell with the greatest geographical coverage area of a plurality of cells and the smaller cell may be called as small cells. Therefore, a macrocell may cover a geographical area that comprises multiple small cells such as femtocells, picocells and/or microcells. Utilization of small cells may allow the same frequencies of an available frequency spectrum to be re-used within the coverage area provided by the macrocell.

Dual connectivity may help to increase the aggregated bandwidth which may result in increased throughput and/or reliability as well as reduced latency. For example, 3GPP NR R15 (TS 38.323) proposes an exemplary embodiment of dual connectivity architecture. In some dual connectivity exemplary embodiments a terminal device is connected to for example two access nodes, gNodeBs, and may thereby be connected to multiple carrier components within each gNodeB.

Figure 3:
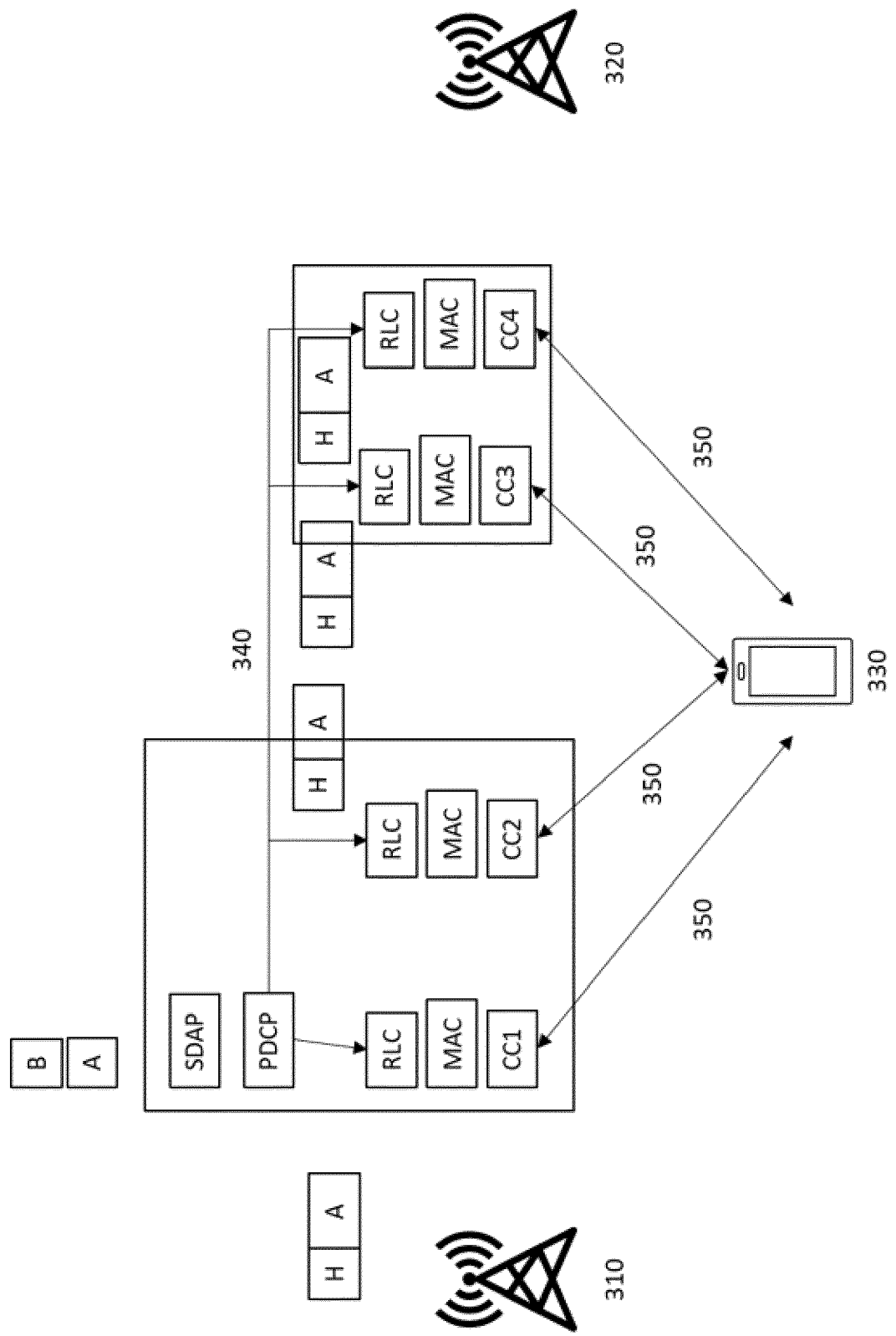
FIG. 3 illustrates an exemplary embodiment of PDCP Duplication over four legs.

FIG. 3 illustrates an exemplary embodiment in which a terminal device 330 is connected to an access node 310, which in this exemplary embodiment is a gNode B, and to another access node 320, which is this exemplary embodiment is another gNode B. It is to be noted that access nodes 310 and 320 could alternatively be any other type of access nodes capable suitable for dual connectivity. The access node 310 in this exemplary embodiment is a master gNode B, MgNB, and the access node 320 is a secondary gNode B, SgNB. The MgNB hosts a service data adaptation, SDAP layer, which receives downlink data packages from the core network and passes the data packages on to a packet data convergence protocol, PDCP, layer which is also hosted by the MgNB. The PDCP layer controls the duplication of data packets. The MgNB further hosts a radio resource control, RRC, control plane that is used for connection and signaling with the terminal device 330. The RRC plane may, in some exemplary embodiments, be considered as the main RRC plane. In this exemplary embodiment, the MgNB initiates a dual-connectivity setup with the SgNB for the terminal device 330. In some alternative exemplary embodiments, the MgNB may initiate dual connectivity setups also with additional secondary access nodes in addition to the SgNB. Those additional secondary access nodes may also be secondary gNodeBs. An interface 340 is, in this exemplary embodiment, used to connect the MgNB and the SgNB and to transfer PDCP packet data units, PDUs duplicated at the MgNB to an associated radio link control, RLC, layer hosted by the SgNB. The MgNB may additionally activate more than one secondary cells, SCells, on the SgNB. The RRC control plane messages are transmitted primarily by a Primary Cell, PCell. The PCell is provided by the MgNB that may, in some exemplary embodiments, provide a plurality of cells among which one is the PCell. In some exemplary embodiments, the terminal device 330 may have two RRC connections when using dual connectivity, one to each access node. It is to be noted that in some exemplary embodiments, there may be multiple secondary cells, in carrier aggregation mode, configured on either node or on both the MgNB and the SgNB, which may increase bandwidth or exploit spatial diversity to enhance reliability and performance.

As described above, in this exemplary embodiment, the PDCP duplication is operated in a way that the PDCP layer in MgNB duplicates the downlink traffic that is then delivered on radio links 350, that are referred to as transmission legs or legs from here on, that connect different cells to the terminal device 330. In some exemplary embodiments, the node hosting the PDCP layer performing duplication may be the SgNB. In this exemplary embodiment, there are four legs in the combination of dual connectivity combined with carrier activation. Likewise, in the uplink, the MgNB and/or SgNB may indicate to the terminal device 330 to duplicate uplink traffic by activating data duplication and/or by activating certain legs. The RRC signaling may be utilized for the activation of such indication(s). When using data duplication, the data reliability may thereby be increased in case of packet failures occurring on some legs. This duplication mechanism may be supported for example for a maximum of 2 legs, i.e. 2 copies, like described in the 3GPP Release15 of NR and LTE. In some alternative exemplary embodiments, the mechanism may be extended up to N legs, where N is larger than 2 and e.g. 4, meaning that up to 4 copies of the same PDCP PDU of a radio bearer can be transmitted.

PDCP duplication over two or more legs may have the benefit of reducing the probability of packet errors, including having two consecutive packet transmission errors. However, PDCP duplication may also increase the carried traffic and thereby also increase interference due to the transmission of multiple copies of the same PDU over multiple legs. Limited time diversity may be exploited for the transmission of duplicates from different legs. Duplicates may be generated by the PDCP layer and sent to the lower layers for transmission. In some exemplary embodiments it may be possible that the performance of the legs, for example signal level and/or signal quality, is correlated in time and therefore all links used for the transmission of the replica may suffer from low channel condition at the same time, if the terminal device is at cell edge, for example. This may lead to packet losses.

Time Sensitive Communications (TSC) may be used in Industrial Internet of Things (IIoT) use cases, for example in industrial automation. For example, motion control commands and/or feedback may be transmitted as Ultra Reliable Low Latency Communications (URLLC) traffic to benefit of the mechanisms provided by 5G, such as those described in Rel.15 NR, for the protection and fast transmissions of communication over the radio, like for example prioritizing an URLLC transmission by puncturing an ongoing eMBB transmission implemented by a scheduler. The timeliness and correctness requirements of TSC may however require an additional layer of protection, prioritization and/or reliability. This may be, at least partly, because in several configurations, for example subcarrier spacing of 30 kHz or above, only 1 HARQ retransmission can be accommodated within the 1-ms delay budget of URLLC. Also, there may not be time to accommodate for RLC retransmissions, i.e. RLC unacknowledged mode is assumed for URLLC.

To mitigate the increase of carried load and interference, enhancements for improving the radio efficiency of PDCP duplication, such as selective PDCP duplication and PDCP PDU dropping may be utilized. With these enhancements, transmitting unnecessary PDCP PDUs may be avoided, when a copy has been successfully received by relying on signaling between the gNB and the UE and/or between gNBs to inform the transmitting entity about the PDUs that have been correctly received.

To reduce the data packet losses, coding methods that combine multiple PDUs together, an identification mechanism to identify coded and encoded messages, a method to generate sequence numbers (SN) for coded messages and delete duplicates, decoding methods to recover original messages, and a signaling procedure to reset the coded duplication when the receiver has collected the original packets may be utilized.

According to an exemplary embodiment, there is a method comprising coding of two or more distinct data packets, which may also be referred to as packets or PDUs, together and decoding of the data packets that were coded to recover the original data. The method may be used in combination with a data duplication scheme such as PDCP-layer duplication or higher layer duplication, i.e. above PDCP, which may increase reliability and resource efficiency. In following exemplary embodiments, a coding and decoding framework is provided in the context of PDCP duplication and is called PDCP Coded Duplication (PDCP-CD). It is to be noted that the coding and decoding framework may flexibly operate to increase reliability against two or more simultaneous transmission errors such as multiple legs failing at the same time, and/or to increase reliability against two or more consecutive transmission errors such as same leg failing across time.

In an exemplary embodiment, an indication is provided to a receiver to identify that the received data packet was coded, which original data packets formed such coded data packet and which, one or more, coding functions and parameters were used to form the coded data packet, thus enabling the corresponding decoding and recovery of the original data at the receiver. The receiver may be an apparatus such as a terminal device or an apparatus such as an access node. The indication, e.g. A and B, may be provided for instance dynamically within the data packet, in the form of a flag or an index embedded in the PDCP header, as a new IE using some of existing reserved bits. Some parts of this indication, e.g. C, may be static or semi-static and therefore may be pre-defined, for example by defining those in a specification, or configured via RRC signaling. Additionally, the method may include a procedure to progress a coded duplication transmitter window if the receiver has successfully received an original data packet. This way received data packets may be removed from the window to avoid using them in future coding process. Additionally, to further improve reliability against consecutive transmission errors, a Consecutive Errors Correction (CEC) scheme that dynamically determines either to code or duplicate data packets according to a notification of a successful reception of previous data packets may be utilized.

In some exemplary embodiments, it may be determined if at least two data packets are to be duplicated based on, at least partly, one or more of the following: a notification, a condition, or a first indication. The notification may comprise information regarding a packet loss and/or a packet timeout, the first indication may comprise a signal from another apparatus and the condition may comprise a Boolean clause.

In an exemplary embodiment, a PDCP layer at a transmitter, which may be comprised in an access node such as a gNodeB or an apparatus such as a terminal device, receives a sequence of distinct data packets from an upper layer such as an SDAP layer. Data packets comprised in the sequence of distinct data packets may then be stored for example in the PDCP buffer with the PDCP sequence number, SN, in the header indicating their order. In this exemplary embodiment the PDCP layer takes two or more data packets from the buffer $P=\{p\_0, p\_1, \ldots, p\_N\}$, as candidate packets to be coded, codes them together, by applying e.g. a bitwise function such as exclusive or, XOR, before delivering them on to one or more legs. A set C of coding functions may be applied to two or more data packets from P to generate new coded data packets $P\hat{\ }c=F\_c(P)$, with c in C, and the size of an original packet, $p\_i$, and of a coded packet, $p\_i\hat{\ }c$, is equivalent, denoted as S in bit. The coding functions may be implemented in a number of ways with different complexity and reliability delivery. One or more logical operations, such as XOR, may be applied to entire P or a subset of P, to generate one or more different coded data packet $P\hat{\ }c$ with size S. The original data packet P and the coded data packet $P\hat{\ }c$ are delivered to different legs, which may improve diversity. It is to be noted that some data packets may be lost for example due to radio failures on some legs. However, the receiver may recover a lost data packet by applying the corresponding decoding function to the received packets: $F\_c\hat{\ }(-1)(P, P\hat{\ }c)$. The decoding procedure may be regarded as the inverse operation of the coding procedure. The error probability of the PDCP-CD according to this exemplary embodiment may be lower than that of a PDCP duplication scheme, thus increasing reliability, i.e. reception probability of a PDU. This may be because the receiver can recover an original data packet from the coded data packets, whereas in PDCP duplication scheme the lost packet may not be recoverable.

Figure 4A:
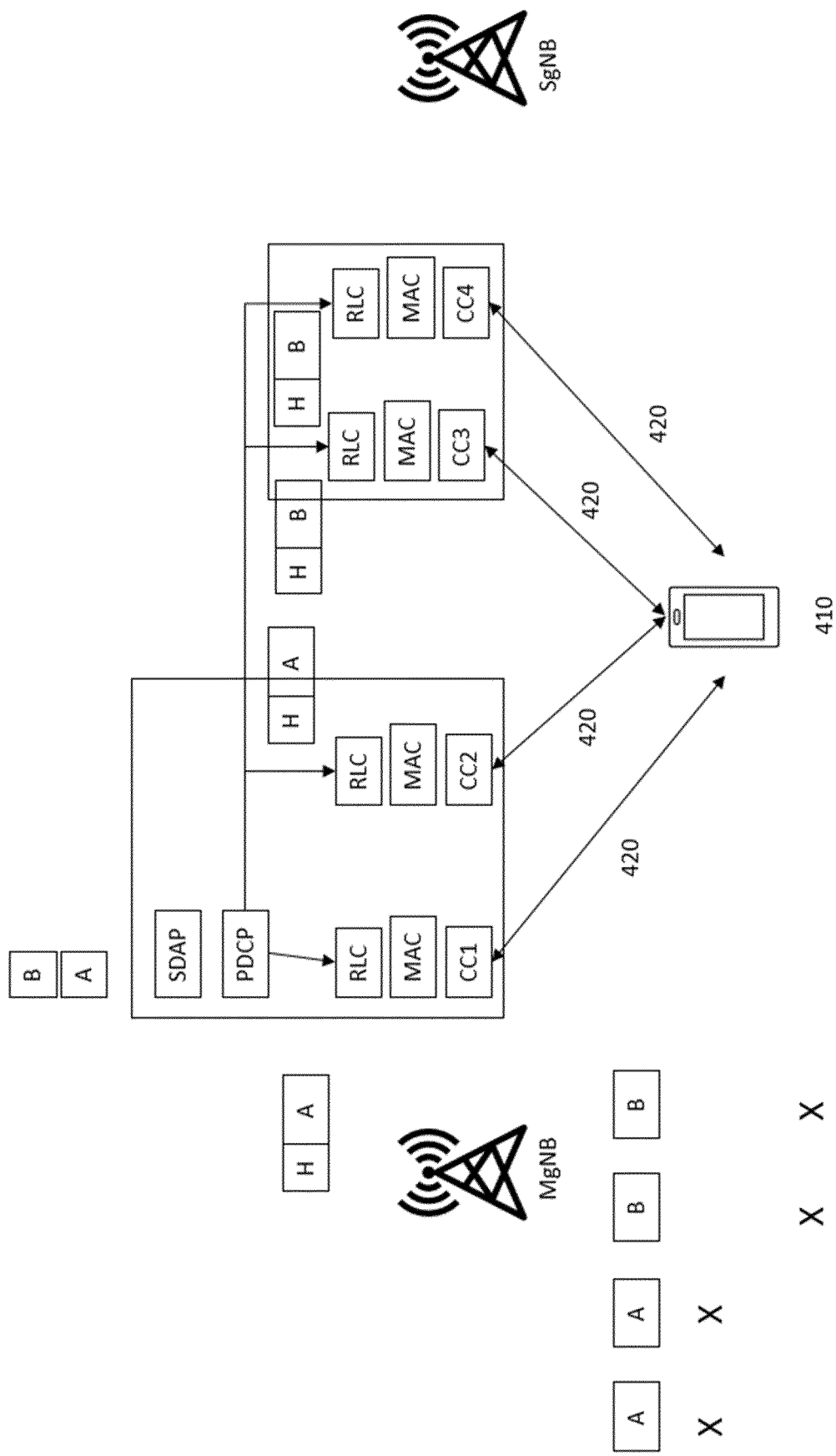
FIGS. 4a-4c illustrate exemplary embodiments of various PDCP implementations.

FIG. 4a illustrates an exemplary embodiment in which a terminal device 410 has two data packets, A and B, and four transmission legs 420. A sequence of crosses on the same line in the FIG. 4a illustrate a sequence of simultaneous transmission errors on the legs 420 that cause a loss of either A or B. It is to be noted that PDCP duplication illustrated in FIG. 4a is also affected by three consecutive errors. However, for the sake of brevity, only some of them are hereby illustrated in this exemplary embodiment. For successful transmission, two objectives may be defined.

Objective 1: A and B are received successfully.

Objective 2: at least A or B are received successfully, i.e. survival time=2 packets.

The following schemes are used in this exemplary embodiment. PDCP duplication with two legs is used to limit radio resource usage. The PDCP transmitter duplicates both A and B and sends the copies for transmission to two out of the four legs 420 that are available in this exemplary embodiment. In other words, one data packet per leg and four data packets in total.

In order to achieve objective 1, it is sufficient that at least one out of the 2 copies of A and B is received successfully at the PDCP receiver. To achieve objective 2, it is sufficient that at least one out of the 4 packets is received successfully at the PDCP receiver.

Figure 4B:
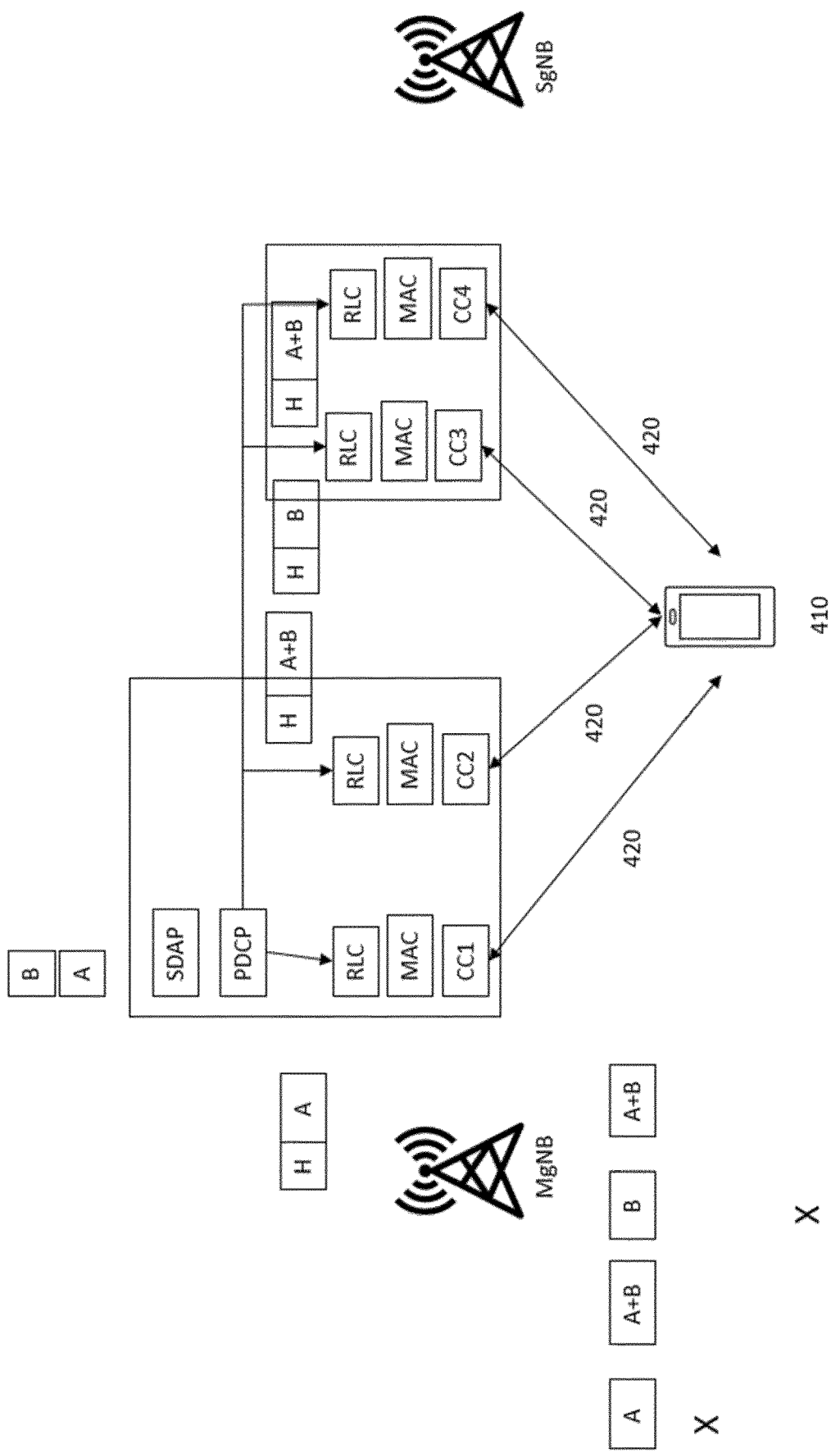

FIG. 4b on the other hand illustrates another exemplary embodiment in which the architecture and objectives correspond to that of the FIG. 4a. A network entity, such as an MgNB, codes A and B generating 1 coded data packet, e.g. $p\_1\hat{\ }c=XOR(A,B)$ and sends A, $p\_1\hat{\ }c$, B and $p\_1\hat{\ }c$ to the four legs 420, respectively, for transmission. In other words, one data packet per leg and four data packets in total.

For objective 1 it is sufficient that at least one uncoded data packet, either A or B, and one coded data packet, $p\_1\hat{\ }c$, are received successfully at the PDCP receiver or that both uncoded data packets A and B are received successfully at the PDCP receiver. For objective 2 it is sufficient that at least one uncoded data packet, either A or B, is received successfully at the PDCP receiver.

Figure 4C:
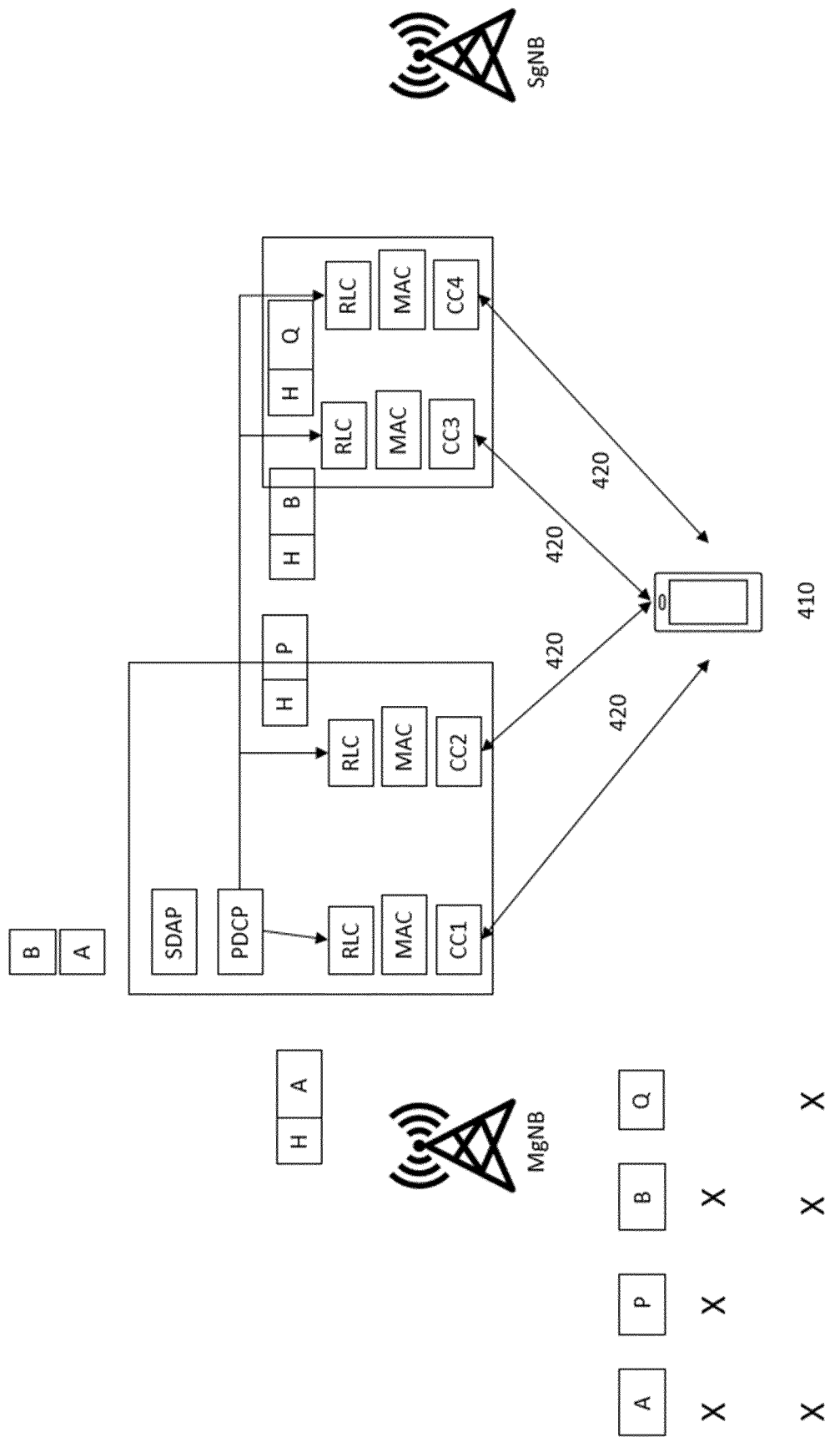

FIG. 4c illustrates a further exemplary embodiment with the same architecture and objectives as FIG. 4a and FIG. 4b. In this exemplary embodiment, the data packets A and B are coded as $P=F\_1$ (A,B) and $Q=F\_2$ (A,B) by the PDCP transmitter, where the function $F\_1$ and $F\_2$ are e.g. designed using the Forward Error Correction, FEC, scheme that can withstand any two errors. FEC may comprise using at least one of the following operations: logical, Boolean, shift, concatenation and linear feedback shift register. Then data packets A, B, P and Q are delivered to the four legs 420, respectively. A benefit with this scheme is that there is a data packet error only if at least three simultaneous errors on three different legs occur, in other words, if any combination of three data packets is lost. To achieve objective 2 it is sufficient that at least any two data packets, either coded or uncoded, or any mix of the two types, are received successfully at the PDCP receiver. To achieve objective 2, it is therefore sufficient that at least one out of two original data packets, either A or B, is received successfully at the PDCP receiver or that the two coded data packets P and Q are received successfully at the PDCP receiver, which also meets objective 1.

It is to be noted that in the scheme illustrated in FIG. 4a, i.e. PDCP duplication, where data packets are simply duplicated, the error probability for Objective 1 doubles with respect to the scheme illustrated in FIG. 4b, i.e. network coding, when two simultaneous leg errors occur. The coded scheme in FIG. 4c, i.e. PDCP-CD combining PDCP duplication and network coding, is even more reliable than the one in FIG. 4b, since only three simultaneous transmission errors result in packet loss of either A or B. It is further to be noted that also the coding scheme may be different: it may be more robust to transmission errors, and flexible enough to cover multiple configurations and coding methods, for example, more than four legs, coding over time, beyond over space. Furthermore, it may not be required to wait for as many data packets to generate a coded data packet.

In PDCP duplication, reliability performance may be increased by selecting the best one or more legs for transmitting one or more copies of a data packet at a given time. However, the legs may not be equally reliable to carry a packet at that time. One of the legs may have a better quality than others, for example higher reference signals received power, RSRP, reference signal received quality, RSRQ, or signal-to-interference-plus-noise ratio, SINR. This may be caused, for example, because of operating at a lower frequency carrier or due to a closer UE proximity to a gNB. Therefore, assuming independent packet errors across legs and identical reliability performance, for example by modelling identically distributed random variables for the reliability of legs, may result in a suboptimal transmission success outcome of the one more copies of a data packet. Furthermore, the relative reliability performance, or ranking, of the legs may vary in time, for example due to UE movement or changes in network conditions.

When combining PDCP duplication with network coding, two or more distinct data packets (A and B in FIG. 4c) can be coded together, and these coded packets (P and Q in FIG. 4c) may be used to recover the original data (A and B). By transmitting these different versions of the packets, the coded packets (P and Q) and uncoded packets (A and B), over different legs, lower latency and higher reliability may be obtained, when compared to transmitting the original packets (A and B) twice as in PDCP duplication.

However, given the differences in reliability across transmission legs, it may not be obvious which legs should be selected for transmitting a certain type of data packet, for example coded or uncoded, when network coding is utilized in order to optimize the overall reliability performance. After generating the coded packets according to a network coding scheme, a terminal device or a network entity such as an access node may determine how to assign, i.e. map, a data packet type to a subset of legs based on a reliability estimate of the available transmission legs. The reliability estimate may indicate for example the transmission success probability of a transmission leg, when transmitting a data packet to a receiver. The transmission success probability may equal 1−transmission error probability. A data packet may then be transmitted to a receiver over the subset of transmission legs that the data packet type of said data packet is assigned to. The transmission success probability of transmission legs may be estimated for example by using marginal or conditional probabilities. Transmission errors over multiple legs may be correlated, and therefore in some exemplary embodiments the conditional probability of an error over a leg when there is an error over another leg may be used to estimate the correlation of transmission errors over multiple legs. On the other hand, marginal probability may be used in some exemplary embodiments to estimate the probability of a transmission error over a leg irrespective of other transmission errors on other legs.

Figure 5:
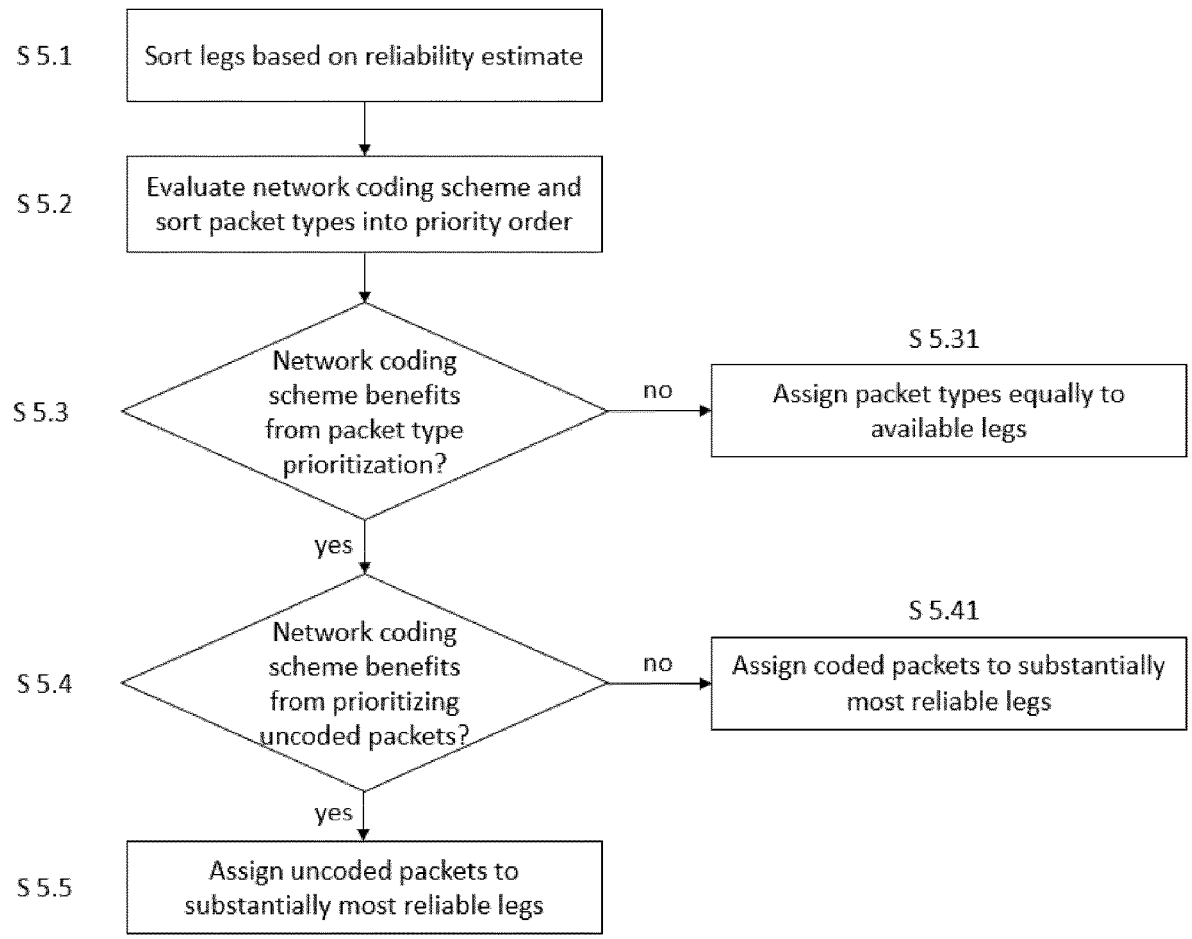
FIG. 5 illustrates a flow chart of an exemplary embodiment.

FIG. 5 illustrates a flow chart according to an exemplary embodiment, in which a network coding scheme is utilized in conjunction with PDCP duplication. However, it should be noted that in some exemplary embodiments network coding may be used without PDCP duplication. The steps in FIG. 5 may be executed by a transmitter comprised in, for example, an access node in downlink transmissions or a terminal device in uplink transmissions. In S 5.1, a reliability estimate is obtained for a plurality of, i.e. two or more, transmission legs, and the transmission legs are ranked based on their reliability estimate to identify which is the most reliable or substantially most reliable leg, the least reliable leg, etc. The reliability estimate of a configured/activated transmission leg at a given time may be obtained by a terminal device or an access node based on past error rates, for example, a past average packet error rate, PER, or block error rate, BLER, experienced for previous packets within a certain time window. In other words, the success rate of past transmissions may be used to obtain error probabilities for the legs, and then these error probabilities may be compared between the legs in order to rank them by reliability. As an example, BLER may be obtained for one or more legs without extra signaling by calculating a ratio between acknowledgments interpreted as negative ones and number of data blocks transmitted. If an access node obtains the estimate, it may signal to a terminal device the estimated reliability performance values or the reliability ranking of the legs, for example, via a medium access control, MAC, control element, CE. The ranking may be provided, for example, with the same MAC CE, which activates the RLC entities for duplication. As an alternative or in addition to PER/BLER, the reliability estimate may be based on one or more radio quality parameters of a transmission leg, such as SINR, RSRP, RSRQ, channel quality indicator, CQI, channel state information, CSI, power headroom indicator, and/or the used modulation and coding scheme, MCS, at a given time. For example, the reliability estimate may be obtained with link-to-system mapping, where SINR and MCS are converted to error probability. In some exemplary embodiments, the reliability estimate may also be obtained by predicting expected errors based on the past error rates and/or estimates of the radio quality parameters. It should also be noted that the reliability estimate may be based at least partly on feedback obtained from a receiver. This feedback may comprise for example CQI reports, CSI reports, acknowledgement, ACK, signals, or negative-acknowledgement, NAC K, signals.

In S 5.2, the utilized network coding scheme is evaluated and data packet types are sorted into priority order, for example a priority order list. Based on the priority order, prioritized packet type(s) may be assigned to the most reliable or substantially most reliable transmission leg(s), i.e. the leg(s) that are ranked higher in S 5.1 based on their reliability estimate. In other words, a priority for a data packet type may be obtained based on the priority order, and that data packet type may then be assigned to a subset of the plurality of transmission legs based on said priority and said reliability estimate. The prioritization of packet types may depend on the utilized network coding scheme and/or number of available transmission legs, for example. Some examples of network coding schemes are XOR-based network coding, FEC-based network coding, or random linear, RL, network coding. However, it should be noted that any network coding scheme may be used in some exemplary embodiments. In network coding, uncoded packets are delivered to the lower layers in addition to one or more different types of coded packets, the number and type of which may depend on the utilized network coding scheme.

In some exemplary embodiments, the evaluation of the network coding scheme may comprise testing different combinations of network coding schemes and assignments of data packet types to transmission legs, and checking which combinations result in successfully decoding an original data packet. Thus, it may be determined which packet type(s) have more impact in overall reliability over other packet type(s), and should therefore be prioritized. For example, the priority of one or more packet types may be obtained by dynamically calculating different combinations of packet types and copies that may need to be received within a certain delay budget in order to be able to decode the original data successfully, while taking into account packet failure rates. In another exemplary embodiment, systems simulation may be utilized for determining the priority order of packet types.

Alternatively, in some exemplary embodiments the network coding scheme evaluation may be pre-calculated and priority/mapping rules may be pre-determined according to network conditions. The packet type based prioritizations may be pre-determined for the supported network coding scheme(s) for example as a function of the number of copies per PDU. This pre-determined priority order for different packet types in different network coding schemes may be inserted into a data structure, such as a lookup table. Then this computationally less complex pre-configured data structure, for example a lookup table, may be used by a terminal device or an access node for obtaining the priority order of different data packet types, or a priority of a data packet type, for the utilized network coding scheme and/or transmission leg configuration, i.e. the number of legs that are activated. In some exemplary embodiments, the pre-configured data structure, for example a lookup table, comprising the priority rules may be available locally in the terminal device or access node, in order to avoid signaling with other devices. For example, the data structure comprising the priority rules may be pre-loaded to a terminal device or access node by a manufacturer.

Furthermore, in some exemplary embodiments configuration data, comprising for example the priority order for different data packet types, reliability estimate(s) of transmission leg(s), and/or policy instructions for how to assign data packet types to transmission legs, may be received by a terminal device from a network entity for example via RRC signaling or a MAC CE. If a network entity pre-determines the rules, the rules may be configured to be applicable semi-statically for a plurality of network coding schemes. In other words, a terminal device may receive network coding configuration parameters, which are valid until the terminal device receives new configuration parameters that override the previous ones. The rules may define for instance the priority order of coded and uncoded packet types to be assigned to the legs ranked according to their reliability. Alternatively, static rules may be specified as standard for a plurality of network coding schemes. The rules may be defined based on the knowledge that a certain network coding scheme may benefit from prioritizing a certain packet type. In other words, different network coding schemes may benefit from different prioritizations of different packet types.

In S 5.3, it is determined whether the utilized network coding scheme benefits from packet type prioritization. This determination may be obtained for example from a pre-configured lookup table or calculated dynamically, as described previously. For network coding schemes that work more reliably if all packet types have similar reliability (S 5.3: no), as equal as possible reliability may be targeted to different packet types, and therefore the packet types may be assigned equally to the available legs in S 5.31. In other words, different packet types may be assigned to legs in a way that each packet type gets an approximately equal reliability, and therefore the decoding probability of all packet types may be equalized, at least approximately. For example, if there are four legs and two packet types, one packet type may be assigned to the most reliable leg and the least reliable leg, and the other packet type may be assigned to the second most reliable leg and the third most reliable leg. Approximately equal reliability may also be achieved by varying leg assignments for each packet type e.g. randomly or on a periodical basis.

If it is determined that the utilized network coding scheme benefits from packet type prioritization (S 5.3: yes), next in S 5.4 it is determined whether the utilized network coding scheme benefits from prioritizing uncoded packets. This determination may also be obtained for example from a pre-configured lookup table or calculated dynamically, as described previously. For network coding schemes that benefit from the presence of uncoded packets more than coded ones (S 5.4: yes), in S 5.5 the uncoded packets are assigned to be transmitted over the most reliable or substantially most reliable leg(s). In other words, the rules may define to first assign any uncoded packets to the most reliable or substantially most reliable leg(s) in order to better protect these packets from transmission failures, and then to assign any coded packets to the remaining leg(s) that are determined to be less reliable.

On the other hand, if it is determined that the utilized network coding scheme benefits from prioritizing coded packets instead (S 5.4: no), then in S 5.41 the coded packets are assigned to be transmitted over the most reliable or substantially most reliable leg(s), i.e. the leg(s) with the highest or substantially highest reliability estimate(s).

It should be noted that the above exemplary embodiment may be applicable for any number of legs, i.e. two or more, when network coding is utilized. Furthermore, in the above exemplary embodiment it is assumed that a previous packet may still be decoded together with extra information obtained when receiving subsequent packet versions in the next transmission occasion. If an even longer packet delay, i.e more than one packet inter-arrival time, may be tolerated, then network coding may yield a higher reliability gain.

It should also be noted that some exemplary embodiments may utilize network coding schemes that use multiple different types of coded packets, and there may be a priority order among the different types of coded packets. In other words, there may be more than two data packet types in some exemplary embodiments. Moreover, some exemplary embodiments may comprise transmission leg(s) that are wired links instead of wireless radio links. Furthermore, in some exemplary embodiments the data packets may be PDUs of other protocols, such as internet protocol packets, instead of PDCP PDUs.

Figure 6:
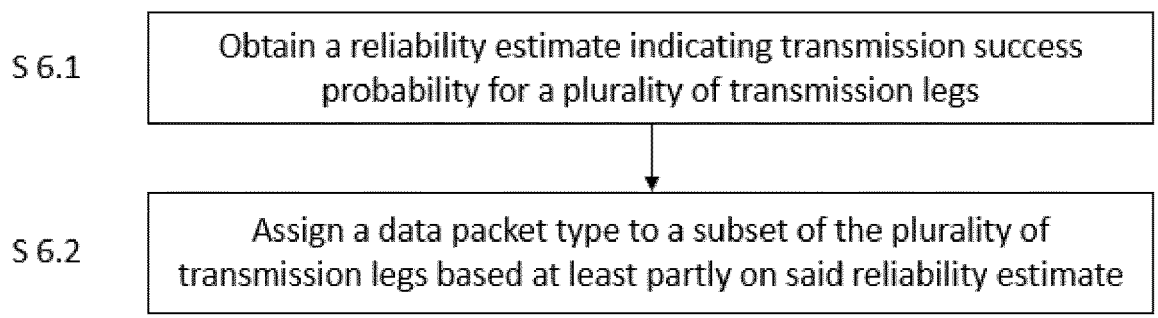
FIG. 6 illustrates a flow chart of an exemplary embodiment.

FIG. 6 illustrates a flow chart according to another exemplary embodiment. The steps in FIG. 6 may be executed by a transmitter comprised in, for example, an access node in downlink transmissions or a terminal device in uplink transmissions. In S 6.1, a reliability estimate indicating transmission success probability is obtained for a plurality of transmission legs, and in S 6.2 a data packet type is assigned to a subset of the plurality of transmission legs based at least partly on said reliability estimate. One or more data packets of this data packet type may then be transmitted over the subset of the plurality of transmission legs that the data packet type is assigned to. It should be noted that in this exemplary embodiment the data packet type may be assigned to the subset of transmission legs without having a priority order for different data packet types. Furthermore, it should be noted that the subset may comprise one or more transmission legs. In case the subset comprises only one transmission leg, then all data packets of this type may be transmitted over this one transmission leg. Alternatively, the data packet type may be assigned to more than one transmission leg, in which case data packets of this type may be transmitted over more than one transmission legs.

It should be noted that in the following performance measurement results of exemplary embodiments, reliabilities of exemplary coding schemes are evaluated with legs that are not equally reliable. This may occur in an exemplary embodiment using packet duplication, where each packet is transmitted over a different leg that is on a separate frequency carrier and might be transmitted/received by a different base station that is not geographically co-located. For comparison, also packet duplication reliability performance over the same number of legs without network coding is provided.

Figure 7:
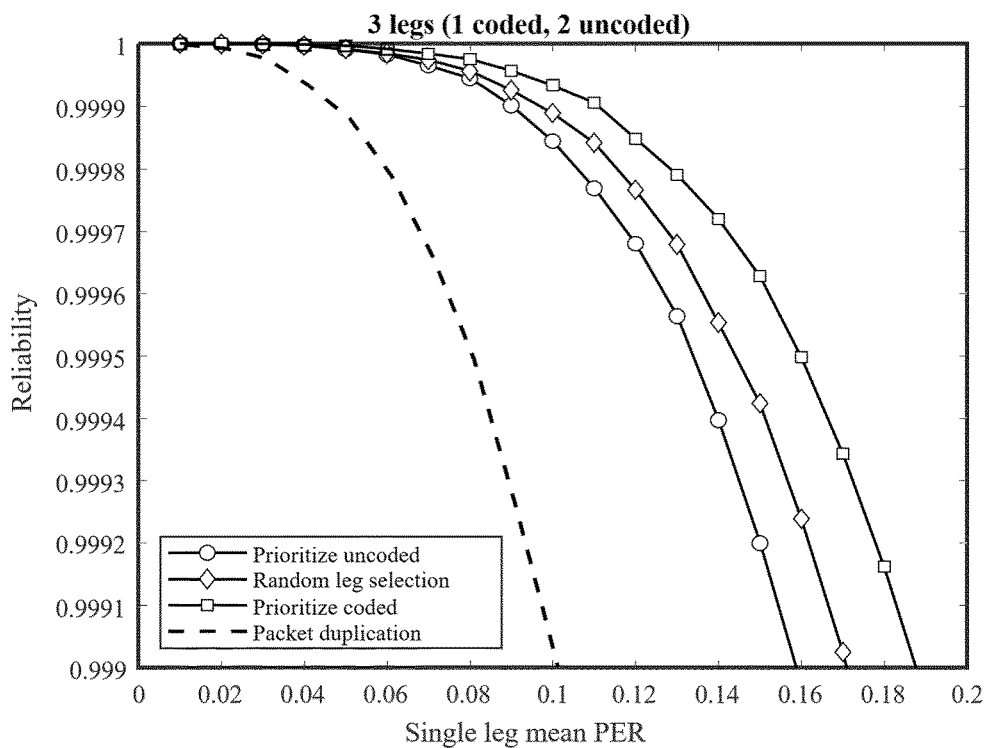
FIGS. 7-9 illustrate reliability measurement results of exemplary embodiments.

FIG. 7 illustrates the performance of an exemplary embodiment, in which packets are transmitted as shown in Table 1. In said exemplary embodiment, when a new data packet arrives, it is transmitted as uncoded over two legs, and coded together with the previous packet for transmission over one leg. XOR-based network coding is utilized in this exemplary embodiment. As can be seen in FIG. 7, in this exemplary embodiment network coding outperforms packet duplication in reliability. With this exemplary network coding scheme, where only one out of three legs is assigned for coded packets, it may be beneficial to transmit coded packets over the most reliable or substantially most reliable transmission leg, i.e. the transmission leg with the highest or substantially highest reliability estimate. Uncoded data packets would then be transmitted over transmission legs with a lower reliability estimate than the one used for transmitting coded data packets. In other words, it may be beneficial for Leg1 in Table 1 to be the most reliable leg in order to maximize reliability in this exemplary embodiment.

TABLE 1

| Time | Original packet arriving to transmission queue (e.g. in PDCP) | Leg1 (coded) | Leg2 (uncoded) | Leg3 (uncoded) |
|---|---|---|---|---|
| 0 | B | B⊕A | B | B |
| 1 | C | C⊕B | C | C |
| 2 | D | D⊕C | D | D |

Figure 8:
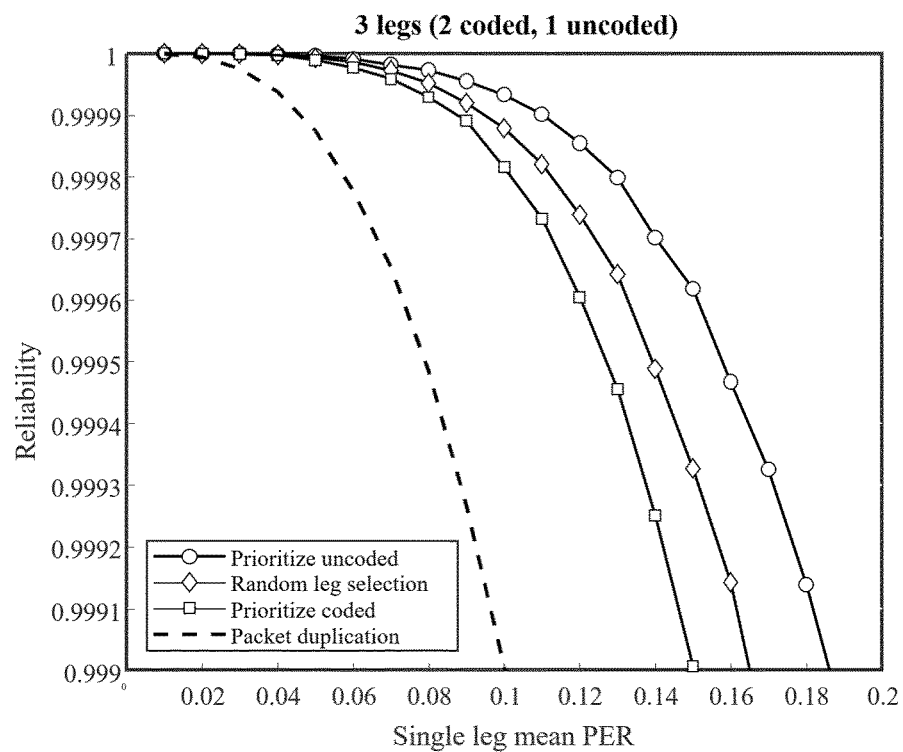

FIG. 8 illustrates the performance of an exemplary embodiment, in which packets are transmitted as shown in Table 2. Two coded packets and one uncoded packet are transmitted, wherein the coded packets are created by a XOR operation coding together the current and previous packet. In this exemplary embodiment, it may be beneficial to prioritize uncoded packets over coded packets, i.e. to transmit uncoded packets over the transmission leg with the highest or substantially highest reliability estimate. Coded data packets would then be transmitted over transmission legs with a lower reliability estimate than the one used for transmitting uncoded data packets. Hence, it may be beneficial for Leg1 in Table 2 to be the most reliable or substantially most reliable leg in order to maximize reliability in this exemplary embodiment.

TABLE 2

| Time | Packet arriving to transmission | Leg1 (uncoded) | Leg2 (coded) | Leg3 (coded) |
|---|---|---|---|---|
| 0 | B | B | B⊕A | B⊕A |
| 1 | C | C | C⊕B | C⊕B |
| 2 | D | D | D⊕C | D⊕C |

Figure 9:
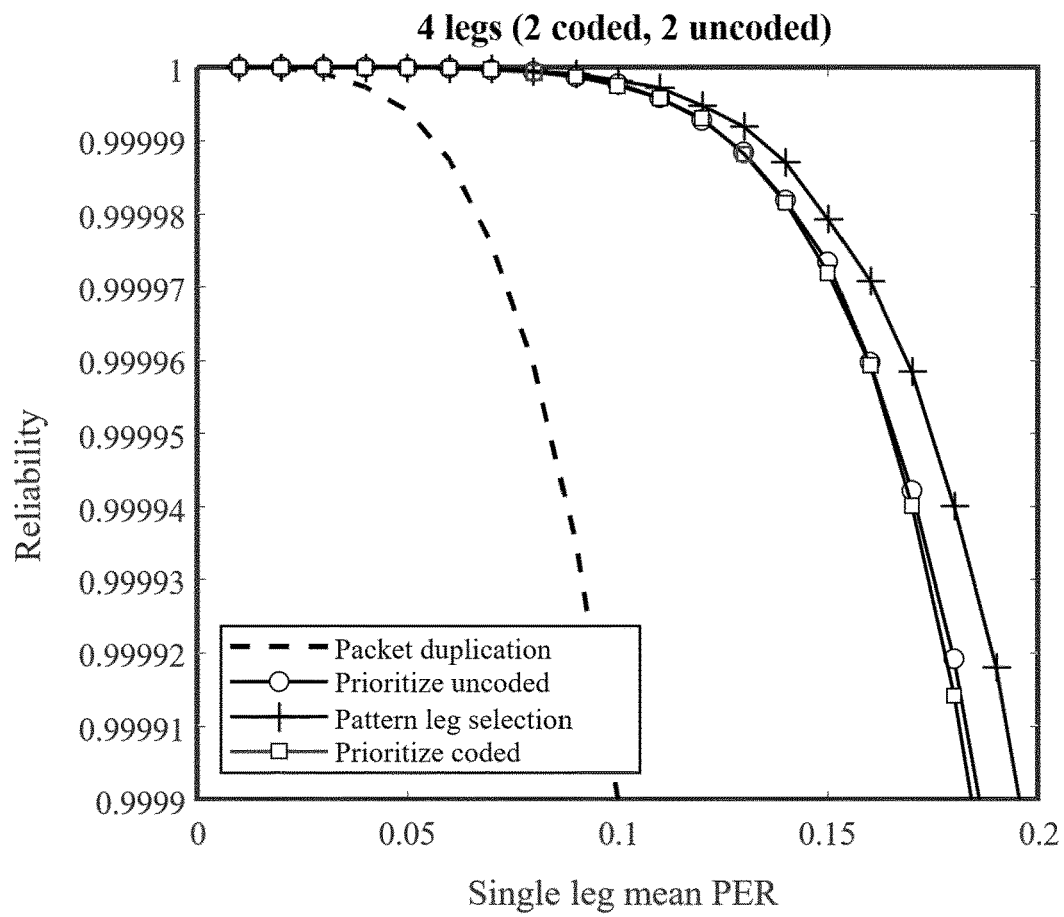

FIG. 9 illustrates the performance of an exemplary embodiment, in which packets are transmitted as shown in Table 3. In this exemplary embodiment, four transmission legs are utilized to transmit two uncoded packets and two coded packets, which are created by a XOR operation coding together two consecutive packets. It should be noted that more than two consecutive packets may be coded together as well. In this exemplary embodiment, reliability may be maximized when the coded and uncoded packets are transmitted over legs, which provide approximately equal reliability for both packet types. In other words, a reliability estimate may be obtained for each available leg, and the packet types may be assigned to the available legs so that that the reliability estimates are made as equal as possible between said packet types. As can be seen in FIG. 9, in this exemplary embodiment the leg selection pattern that equalizes the decoding success probability for both packet types may yield higher reliability than prioritizing a single packet type. In other words, in this exemplary embodiment it may be determined that all packet types have equal priority, and therefore data packets may be assigned to legs so that no packet type is prioritized over the other type(s).

TABLE 3

| Time | Packet arriving to transmission | Leg1 (uncoded) | Leg2 (coded) | Leg3 (coded) | Leg4 (uncoded) |
|---|---|---|---|---|---|
| 0 | B | B | B⊕A | B⊕A | B |
| 1 | C | C | C⊕B | C⊕B | C |
| 2 | D | D | D⊕C | D⊕C | D |

An exemplary leg selection pattern that may be used for obtaining the results shown in FIG. 9 is visualized in Table 4. In this exemplary embodiment, on odd-numbered transmission time occasions, for example the first, third and fifth time occasion, a first data packet type is transmitted to a receiver over the substantially most reliable leg and the least reliable leg, whereas a second data packet type is transmitted over the substantially second most reliable leg and the third most reliable leg at substantially the same time. Then on even-numbered transmission time occasions, for example the second, fourth and sixth time occasion, the first data packet type is transmitted to a receiver over the substantially second most reliable leg and the third most reliable leg, whereas the second data packet type is transmitted over the substantially most reliable leg and the least reliable leg at substantially the same time.

TABLE 4

| Time | Packet arriving to transmission | The most reliable leg | $2^{nd}$ most reliable leg | $3^{rd}$ most reliable leg | The least reliable leg |
|---|---|---|---|---|---|
| 0 | B | B | B⊕A | B⊕A | B |
| 1 | C | C⊕B | C | C | C⊕B |
| 2 | D | D | D⊕C | D⊕C | D |

In another exemplary embodiment, the terminal device or access node may obtain a joint reliability estimate of multiple active legs to determine which legs to use for transmitting the entire set of coded packets, or part of it, and the entire set of uncoded data packets, or part of it. This scheme may be designed to maximize the joint probability of receiving multiple uncoded packets, hence minimizing the loss of the original data when transmission errors affect multiple legs simultaneously. It should be noted that transmission errors simultaneously affecting multiple legs may result in the loss of two consecutive data packets that were coded together, which may have adverse effects because of the survival time. When network coding is applied to pairs of data packets received consecutively by the PDCP layer, the assignment of the type of PDCP PDUs, for example coded or uncoded, to the transmission legs may be decided in order to maximize the probability of jointly decoding the two original data packets. Therefore, the access node and/or the terminal device may maintain an estimation of the joint failure probability of multiple legs and select dynamically the assignment of PDU type and transmission leg in order to maximize the decoding probability of both original PDUs. A sample of the joint error probability may be calculated by counting the number of simultaneous transmission errors within the window corresponding to a predefined number of PDUs. The estimation of the joint error probability may be updated through, for example, sliding window mechanisms that discount old observations/samples over time. Another alternative exemplary embodiment without involving the received data packets in the reliability estimation may comprise using channel measurements, for example SINR, and generating error events according to the estimated probability distribution of each leg.

Figure 10:
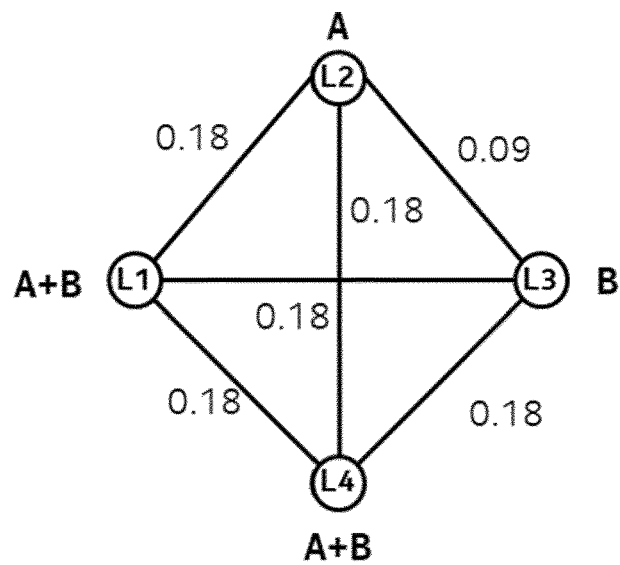
FIG. 10 illustrates joint error probability of two leg failures in an exemplary embodiment.

In an exemplary embodiment with four legs and a PDCP-CD XOR coding mechanism, two consecutive data packets A and B may be coded together to generate a packet P=XOR(A, B)=A⊕B. To maximize reliability, uncoded packets A and B may be transmitted over the two legs with the lowest joint error probability. Table 5 illustrates an example of dynamic mapping that minimizes multiple, in this case two, simultaneous leg failures. The window is composed of 11 PDUs and the joint error probability of two legs is illustrated as edge weights in FIG. 10. At time 12, uncoded packets are assigned to legs L2 and L3 since they have the lowest joint error probability, i.e. lowest two leg failure probability.

TABLE 5

| Time | Leg1 | Leg2 | Leg3 | Leg4 |
|---|---|---|---|---|
| 1 | Error | Error | | |
| 2 | | Error | Error | |
| 3 | | | Error | Error |
| 4 | Error | | | Error |
| 5 | Error | | Error | |
| 6 | | Error | | Error |
| 7 | Error | Error | | |

TABLE 5-continued

| Time | Leg1 | Leg2 | Leg3 | Leg4 |
|---|---|---|---|---|
| 8 | | | Error | Error |
| 9 | Error | | | Error |
| 10 | Error | | Error | |
| 11 | | Error | | Error |
| 12 | A⊕B | A | B | A⊕B |

Figure 11:
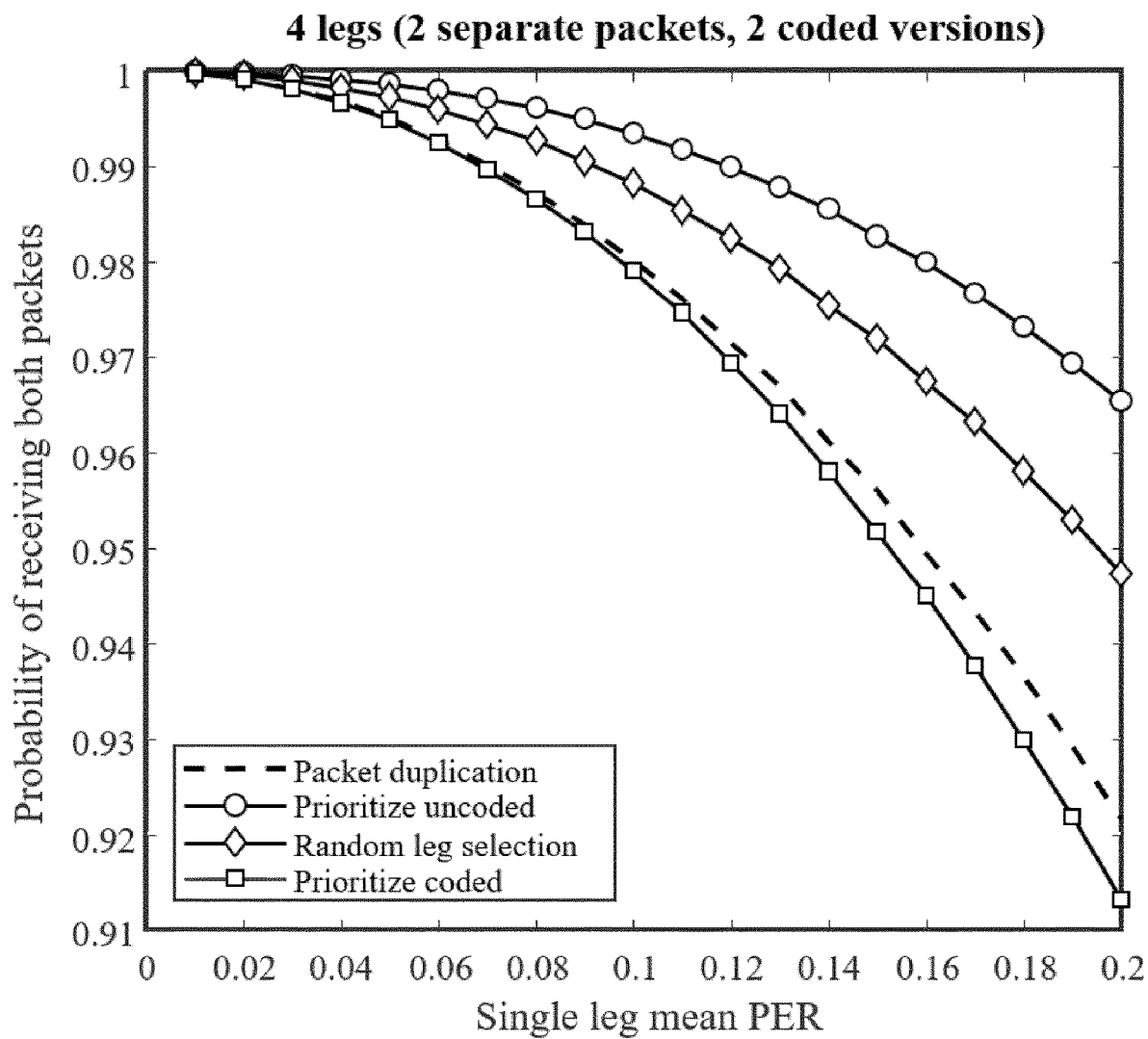
FIG. 11 illustrates reliability measurement results of an exemplary embodiment.

As shown in FIG. 11, in this exemplary embodiment reliability may be increased by selecting jointly multiple most reliable or substantially most reliable legs prioritizing uncoded packets. However, if the network coding scheme used in this exemplary embodiment, i.e. transmitting A, B, A⊕B and A⊕B over four legs, is used without monitoring leg qualities, and uncoded packets are accidentally transmitted over the least reliable legs, then network coding may be more unreliable than packet duplication in this exemplary embodiment. In this exemplary embodiment, packet duplication denotes transmitting two uncoded copies of each separate packet over four legs.

In another exemplary embodiment, the terminal device or access node may reconfigure the network coding scheme to another, if it is determined to be beneficial. This may happen, for example, when the number of sufficiently reliable legs change or when a certain leg's reliability increases or decreases. Then also the priority order of data packet types may have to be reconfigured. As mentioned previously, a pre-configured lookup table may be defined for different numbers of legs and for each supported network coding scheme in order to obtain the priority order of different packet types utilized by the configured network coding scheme, and to avoid signaling the priority order of the different packet types. One exemplary embodiment of such a lookup table for XOR-based network coding is given in Table 6. It should be noted that in this exemplary embodiment, the priority order is defined for two types of data packets, i.e. coded and uncoded. In some other exemplary embodiments, a priority order for more than two packet types may be defined. Moreover, in this exemplary embodiment only the two latest packets are considered in coding. However, in some other exemplary embodiments it may be possible to use more than two latest packets for coding.

TABLE 6

| Number of new uncoded packets transmitted | Number of uncoded copies per new packet | Number of coded packets (current packet coded with previous packet) | Number of legs | Prioritized packet type |
|---|---|---|---|---|
| 1 | 2 | 1 | 3 | coded |
| 1 | 1 | 2 | 3 | uncoded |
| 1 | 2 | 2 | 4 | both equally |
| 2 | 1 | 2 | 4 | uncoded |

It should also be noted that in some exemplary embodiments leg randomization may ensure that averaging is beneficial compared to the possibility of blindly making a "wrong" prioritization decision. Thus, if leg reliabilities cannot be obtained in a trustworthy manner, then leg assignment for different data packet types may be varied e.g. randomly or on a periodical basis.

In another exemplary embodiment, the terminal device or access node may boost the reliability of one or more legs based on the packet type assigned to the leg, for example by increasing the transmission power of these one or more legs. However, this may cause decreasing the reliability, or transmission power, of one or more of the other remaining legs. For example, in some cellular standards, such as 4G-LTE or 5G-NR, the terminal device cannot exceed the defined maximum transmission power limit, for example 23 dBm, as per its power class. If the terminal device transmits multiple packets simultaneously over a plurality of legs, such a maximum transmission power limit may be shared across all of these legs. In such a case, if the terminal device is already using the maximum transmission power limit, it may be beneficial to increase transmission power to leg(s) used for transmitting the packet type that is prioritized for the utilized network coding scheme. However, this may cause decreasing the transmission power of the leg(s) used for transmitting other packet type(s) that are not prioritized. In an alternative exemplary embodiment, if no packet type is prioritized over the other type(s), then transmission power may be (re)allocated among the transmission legs in order to equalize the reliability of the transmission legs as closely as possible.

In another exemplary embodiment, the terminal device or access node may be configured to transmit an uncoded packet over the leg(s) that are determined to be the most reliable or substantially most reliable at a given time regardless of the utilized network coding scheme and packet type prioritization order, if one or more previous transmissions of said uncoded packet have failed for example over some less reliable leg(s). By re-transmitting the packet until it is determined that at least one packet has been successfully decoded, multiple consecutive decoding errors may be avoided, and an upcoming transmission may be received before the URLLC application survival time expires. The survival time may be defined as the time that an application consuming a communication service may continue without an anticipated message.

In another exemplary embodiment, wired backhaul links and/or wireless integrated access and backhaul, IAB, may be used. IAB may use relay nodes to deliver access traffic, and thus wired connections, such as fiber connections, may not be needed. For example, an access node may code together separate data packets, for example two or more data packets having the same destination access node, and deliver different packet types, e.g. coded and uncoded, via separate backhaul hops to the destination access node, from which the received data may be transmitted to one or more terminal devices. These hops may be wired or wireless links between relay nodes delivering packets to an access node. Such an exemplary embodiment utilizing network coding may increase backhaul link reliabilities.

A technical advantage provided by various exemplary embodiments may be that leg selection may be optimized for transmitting a certain type of data packet, for example when network coding is used in conjunction with PDCP duplication. In other words, the overall reliability performance for successfully transmitting data packets to a receiver may be increased. In addition, an exemplary embodiment using a pre-configured lookup table for obtaining the priority order of different packet types may reduce the amount of signaling and coordination between two entities, such as a terminal device and an access node, when compared to a dynamic control scheme. If a dynamic control scheme is used instead of a lookup table, the transmitter may communicate the coding matrix to the receiver every time it is modified, which may add extra signaling and coordination between the two entities, and may thus reduce overall efficiency.

Furthermore, in some exemplary embodiments, the coded packets may be identified according to the coding function used to generate them using for example data comprised in the PDU header. This permits to reduce the complexity of the coordination between transmitter and receiver, since the coding matrix or equivalently the coding functions may be obtained from the data comprised in the PDU header. This way, the receiver may be able to decode the coded packets when a certain number of packets have been collected. Therefore, it may be determined which coded and uncoded packets to transmit and which subset of legs to use, without further communication and coordination between the transmitter and the receiver.

Figure 12:
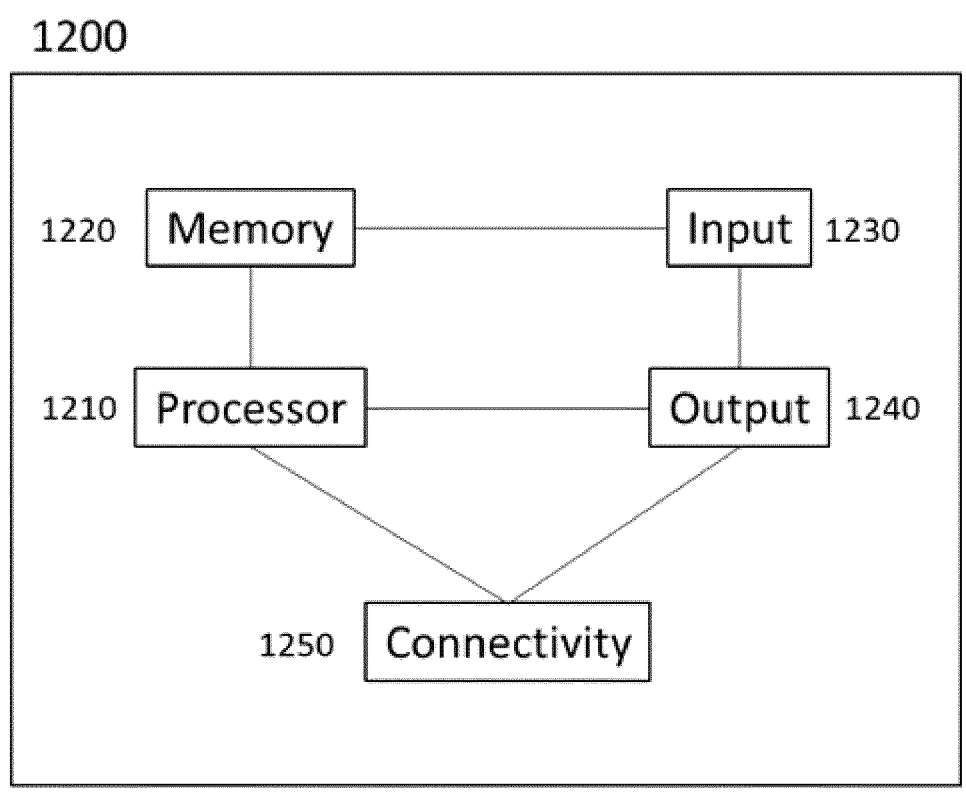
FIG. 12 and FIG. 13 illustrate apparatuses according to exemplary embodiments.

FIG. 12 illustrates an apparatus 1200, which may be an apparatus such as, or comprised in, a terminal device, according to an exemplary embodiment. The apparatus 1200 comprises a processor 1210. The processor 1210 interprets computer program instructions and processes data. The processor 1210 may comprise one or more programmable processors. The processor 1210 may comprise programmable hardware with embedded firmware and may, alternatively or additionally, comprise one or more application specific integrated circuits, ASICs.

The processor 1210 is coupled to a memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example RAM, DRAM or SDRAM. Non-volatile memory may be for example ROM, PROM, EEPROM, flash memory, optical storage or magnetic storage. In general, memories may be referred to as non-transitory computer readable media. The memory 1220 stores computer readable instructions that are execute by the processor 1210. For example, non-volatile memory stores the computer readable instructions and the processor 1210 executes the instructions using volatile memory for temporary storage of data and/or instructions.

The computer readable instructions may have been pre-stored to the memory 1220 or, alternatively or additionally, they may be received, by the apparatus, via electromagnetic carrier signal and/or may be copied from a physical entity such as computer program product. Execution of the computer readable instructions causes the apparatus 1200 to perform functionality described above.

In the context of this document, a "memory" or "computer-readable media" may be any non-transitory media or means that can contain, store, communicate, propagate or transport the instructions for use by or in connection with an instruction execution system, apparatus, or device, such as a computer.

The apparatus 1200 further comprises, or is connected to, an input unit 1230. The input unit 1230 comprises one or more interfaces for receiving a user input. The one or more interfaces may comprise for example one or more motion and/or orientation sensors, one or more cameras, one or more accelerometers, one or more microphones, one or more buttons and one or more touch detection units. Further, the input unit 1230 may comprise an interface to which external devices may connect to.

The apparatus 1200 also comprises an output unit 1240. The output unit comprises or is connected to one or more displays capable of rendering visual content such as a light emitting diode, LED, display, a liquid crystal display, LCD and a liquid crystal on silicon, LCoS, display. The output unit 1240 may comprise two displays to render stereoscopic visual content. One display to render content to the left eye and the other display to render content to the right eye. The output unit 1240 may further comprise a transmission unit, such as one or more waveguides or one or more lenses, to transfer the rendered visual content to the user's field of view. The output unit 1240 further comprises one or more audio outputs. The one or more audio outputs may be for example loudspeakers or a set of headphones.

The apparatus 1200 may further comprise a connectivity unit 1250. The connectivity unit 1250 enables wired and/or wireless connectivity to external networks. The connectivity unit 1250 may comprise one or more antennas and one or more receivers that may be integrated to the apparatus 1200 or the apparatus 1200 may be connected to. The connectivity unit 1250 may comprise an integrated circuit or a set of integrated circuits that provide the wireless communication capability for the apparatus 1200. Alternatively, the wireless connectivity may be a hardwired application specific integrated circuit, ASIC.

It is to be noted that the apparatus 1200 may further comprise various component not illustrated in FIG. 12. The various components may be hardware component and/or software components.

Figure 13:
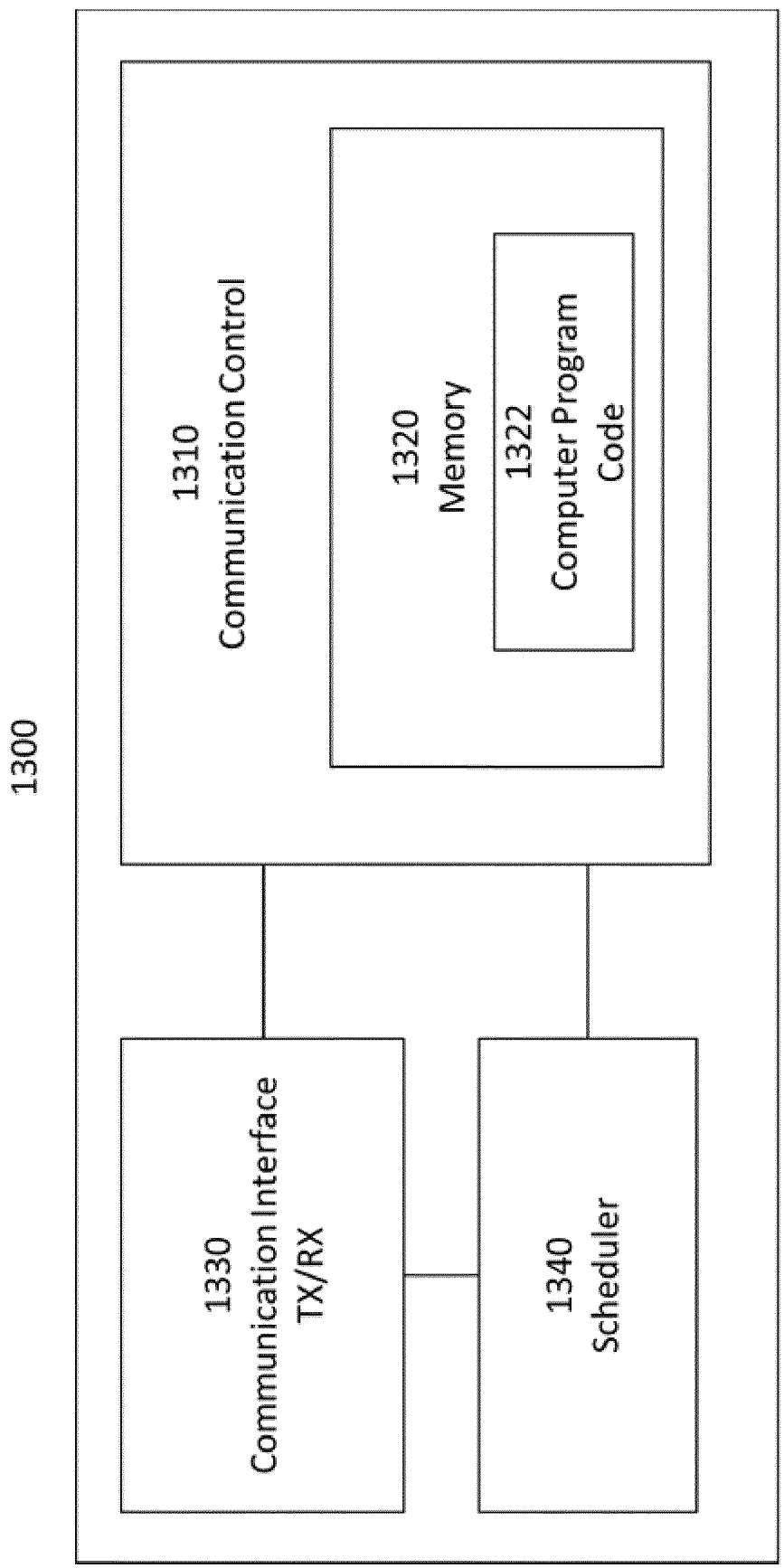

The apparatus 1300 of FIG. 13 illustrates an exemplary embodiment of an apparatus that may be an access node or be comprised in an access node. The apparatus may be, for example, a circuitry or a chipset applicable to an access node to realize the described exemplary embodiments. The apparatus 1300 may be an electronic device comprising one or more electronic circuitries. The apparatus 1300 may comprise a communication control circuitry 1310 such as at least one processor, and at least one memory 1320 including a computer program code (software) 1322 wherein the at least one memory and the computer program code (software) 1322 are configured, with the at least one processor, to cause the apparatus 1300 to carry out any one of the exemplary embodiments of the access node described above.

The memory 1320 may be implemented using any suitable data storage technology, such as semiconductor-based memory devices, flash memory, magnetic memory devices and systems, optical memory devices and systems, fixed memory and removable memory. The memory may comprise a configuration database for storing configuration data. For example, the configuration database may store current neighbour cell list, and, in some exemplary embodiments, structures of the frames used in the detected neighbour cells.

The apparatus 1300 may further comprise a communication interface 1330 comprising hardware and/or software for realizing communication connectivity according to one or more communication protocols. The communication interface 1330 may provide the apparatus with radio communication capabilities to communicate in the cellular communication system. The communication interface may, for example, provide a radio interface to terminal devices. The apparatus 1300 may further comprise another interface towards a core network such as the network coordinator apparatus and/or to the access nodes of the cellular communication system. The apparatus 1300 may further comprise a scheduler 1340 that is configured to allocate resources.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus, comprising:
   at least one processor, and at least one memory including computer program code, wherein the at least one memory and the computer program code are configured, with the at least one processor, to cause the apparatus to:
      obtain a reliability estimate indicating transmission success probability for a plurality of transmission legs, wherein the reliability estimate is obtained based on radio quality parameters of at least one transmission leg, the radio quality parameters comprising the following: signal-to-interference-plus-noise ratio, channel quality indicator, power headroom indicator, and a modulation and coding scheme;
      assign a first data packet type and a second data packet type to a subset of the plurality of transmission legs based at least partly on the reliability estimate, wherein a plurality of data packet types are sorted into a priority order, wherein the first data packet type is assigned at least to a transmission leg with a substantially highest reliability estimate, and the second data packet type is assigned at least to a transmission leg with a substantially second highest reliability estimate;
      generate coded data packets from a plurality of data packets using a network coding scheme;
      determine that utilizing the network coding scheme benefits from packet type prioritization;
      upon determining that utilizing the network coding scheme benefits from packet type prioritization, determine that utilizing the network coding scheme benefits from prioritizing uncoded data packets; and
      based on determining that utilizing the network coding scheme benefits from prioritizing the uncoded data packets, assigning the uncoded data packets to most reliable transmission legs based on the reliability estimate and assigning any of the coded packets to remaining legs that are determined to be less reliable.

2. The apparatus according to claim 1, wherein a network coding scheme is utilized in conjunction with packet data convergence protocol duplication.

3. The apparatus according to claim 1, wherein the reliability estimate is obtained based at least partly on a past average packet error rate or a block error rate of at least one transmission leg.

4. The apparatus according to claim 1, further comprising receiving configuration data comprising the following: a priority order for a plurality of data packet types, a reliability estimate indicating transmission success probability for a plurality of transmission legs, and instructions for assigning at least one data packet type to a subset of the plurality of transmission legs.

5. The apparatus according to claim 1, further comprising obtaining a priority for a data packet type, and assigning the data packet type to a subset of the plurality of transmission legs based at least partly on the priority and the reliability estimate.

6. The apparatus according to claim 5, wherein the priority for the data packet type is obtained from a pre-configured data structure.

7. The apparatus according to claim 5, wherein the priority for the data packet type is obtained based on the utilized network coding scheme and number of available transmission legs.

8. The apparatus according to claim 1, further comprising transmitting a data packet to a receiver over the subset of transmission legs that a data packet type of the data packet is assigned to.

9. The apparatus according to claim 1, further comprising increasing transmission power of a transmission leg based on a data packet type assigned to it, and decreasing transmission power of one or more other transmission legs.

10. The apparatus according to claim 1, further comprising obtaining a joint reliability estimate for a plurality of active transmission legs.

11. The apparatus according to claim 1, wherein an uncoded data packet is transmitted over the transmission leg with the substantially highest reliability estimate based on a previous transmission of the uncoded data packet failed.

12. The apparatus according to claim 1, further comprising varying transmission leg assignment for a data packet type on a periodical basis.

13. A system comprising:
    an apparatus
    a processor; and
    a memory comprising computer-readable media comprising computer-executable instructions that, when executed by the processor, cause the processor to perform the following operations:
       obtaining a reliability estimate indicating transmission success probability for a plurality of transmission legs, wherein the reliability estimate is obtained based on radio quality parameters of at least one transmission leg, the radio quality parameters comprising the following: signal-to-interference-plus-noise ratio, channel quality indicator, power headroom indicator, and a modulation and coding scheme;
       assigning a first data packet type and a second data packet type to a subset of the plurality of transmission legs based at least partly on the reliability estimate, wherein a plurality of data packet types are sorted into a priority order, wherein the first data packet type is assigned at least to a transmission leg with a substantially highest reliability estimate, and the second data packet type is assigned at least to a transmission leg with a substantially second highest reliability estimate;

generating coded data packets from a plurality of data packets using a network coding scheme;

determining that utilizing the network coding scheme benefits from packet type prioritization;

upon determining that utilizing the network coding scheme benefits from packet type prioritization, determining that utilizing the network coding scheme benefits from prioritizing uncoded data packets; and based on determining that utilizing the network coding scheme benefits from prioritizing the uncoded data packets, assigning the uncoded data packets to most reliable transmission legs based on the reliability estimate and assigning any of the coded packets to remaining legs that are determined to be less reliable.

14. The system of claim 13, wherein a network coding scheme is utilized in conjunction with packet data convergence protocol duplication.

15. The system of claim 14, wherein the reliability estimate is obtained based at least partly on a past average packet error rate or a block error rate of at least one transmission leg.

16. The system of claim 15, wherein the computer-executable instructions further cause the processor to receive configuration data comprising the following: a priority order for a plurality of data packet types, a reliability estimate indicating transmission success probability for a plurality of transmission legs, and instructions for assigning at least one data packet type to a subset of the plurality of transmission legs.

17. The system of claim 15, wherein the computer-executable instructions further cause the processor to increase transmission power of a transmission leg based on a data packet type assigned to it, and decreasing transmission power of one or more other transmission legs.

18. A method comprising:

obtaining a reliability estimate indicating transmission success probability for a plurality of transmission legs, wherein the reliability estimate is obtained based on radio quality parameters of at least one transmission leg, the radio quality parameters comprising the following: signal-to-interference-plus-noise ratio, channel quality indicator, power headroom indicator, and a modulation and coding scheme;

assigning a first data packet type and a second data packet type to a subset of the plurality of transmission legs based at least partly on the reliability estimate, wherein a plurality of data packet types are sorted into a priority order, wherein the first data packet type is assigned at least to a transmission leg with a substantially highest reliability estimate, and the second data packet type is assigned at least to a transmission leg with a substantially second highest reliability estimate;

generating coded data packets from a plurality of data packets using a network coding scheme;

determining that utilizing the network coding scheme benefits from packet type prioritization;

upon determining that utilizing the network coding scheme benefits from packet type prioritization, determining that utilizing the network coding scheme benefits from prioritizing uncoded data packets; and based on determining that utilizing the network coding scheme benefits from prioritizing the uncoded data packets, assigning the uncoded data packets to most reliable transmission legs based on the reliability estimate and assigning any of the coded packets to remaining legs that are determined to be less reliable.

19. The method of claim 18, wherein a network coding scheme is utilized in conjunction with packet data convergence protocol duplication, and wherein the reliability estimate is obtained based at least partly on a past average packet error rate or a block error rate of at least one transmission leg.

20. The method of claim 19, further comprising receiving configuration data comprising the following: a priority order for a plurality of data packet types, a reliability estimate indicating transmission success probability for a plurality of transmission legs, and instructions for assigning at least one data packet type to a subset of the plurality of transmission legs.

* * * * *